United States Patent [19]

Sawamura et al.

[11] Patent Number: 4,920,007
[45] Date of Patent: Apr. 24, 1990

[54] MAGNETO-OPTICAL RECORDING MEDIUM WITH 9:1–1:9 ALUMINUM OR SILICON OXIDE AND ALUMINUM OR SILICON NITRIDE MIXTURE

[75] Inventors: Mitsuharu Sawamura; Kazuoki Hongu, both of Yokohama; Kazuhiko Kikuchi, Kawasaki, all of Japan

[73] Assignee: Canon Kabushiki Kaisha, Tokyo, Japan

[21] Appl. No.: 244,541

[22] Filed: Sep. 12, 1988

Related U.S. Application Data

[63] Continuation of Ser. No. 32,998, Mar. 30, 1987, abandoned, which is a continuation of Ser. No. 688,430, Jan. 2, 1985, abandoned.

[30] Foreign Application Priority Data

Jan. 10, 1984 [JP] Japan ..................... 59-1406

[51] Int. Cl.$^5$ .................. B32B 15/04; G11B 5/66
[52] U.S. Cl. .................. 428/457; 428/472; 428/694; 428/698; 428/702; 428/900
[58] Field of Search .......................... 428/457

[56] References Cited

U.S. PATENT DOCUMENTS

| | | | |
|---|---|---|---|
| 4,461,807 | 7/1984 | Mori et al. | 430/945 |
| 4,473,633 | 9/1984 | Wada et al. | 430/945 |
| 4,489,139 | 12/1984 | Ohta et al. | 428/900 |

OTHER PUBLICATIONS

Katayama et al., "Study of High Reliability of the Magneto-Optic Medium with the Multi-Layer Structure", Nov. 1983

*Primary Examiner*—George F. Lesmes
*Assistant Examiner*—Dennis V. Carmen
*Attorney, Agent, or Firm*—Fitzpatrick, Cella, Harper & Scinto

[57] ABSTRACT

An optical recording medium including an opto-magnetic recording medium is provided with a protective layer of an oxide-nitride mixture on either one side or both sides of the optical recording layer. Because of the provision of the mixture layer, the optical recording layer not only has an improved durability such as a corrosion resistance but also can have improved writing and reading efficiencies through adjustment of the refractive index of the mixture layer.

9 Claims, 1 Drawing Sheet

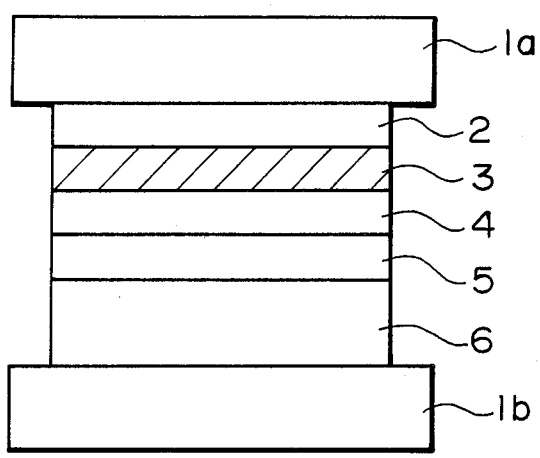

MAGNETO-OPTICAL RECORDING MEDIUM WITH 9:1–1:9 ALUMINUM OR SILICON OXIDE AND ALUMINUM OR SILICON NITRIDE MIXTURE

This application is a continuation of application Ser. No. 032,998, filed Mar. 30, 1987, which in turn is a continuation of parent application Ser. No. 688,430, filed Jan. 2, 1985, both now abandoned.

BACKGROUND OF THE INVENTION

The present invention relates to an optical recording medium in which recording and reproduction can be effected by means of a light beam.

As optical recording media or materials for optical disks, optical cards, optical tapes, etc., there have been heretofore known rare earth-transition metal alloy films, films of reducing oxides such as chalcogen compounds utilizing phase transition between amorphous and crystalline states, heat mode recording media, thermoplastic recording media, etc. More specifically, as the rare earth-transition metal optomagnetic recording media, there have been known polycrystalline films such as those of MnNi and MnCuBi; amorphous films such as those of GdCe, GdFe,TbFe, DyFe, GdTbFe, TdDyFe, GdFeCo, TbFeCo and GdTbCo; and single-crystalline films such as that of GdIG.

Among these optical recording media in the form of films, the above-mentioned amorphous film has been recently considered excellent in view of such factors as film formability for producing a large area of film around room-temperature, writing efficiency for writing signals at a small optical heat energy, and readout efficiency for reading out written signals at a good S/N ratio. Especially, GdTbFe has been considered to be the optimum optical heat recording medium because it has a large Kerr rotation angle and a Curie point at around 150° C.

However, the optical recording medium generally has a drawback that it is poor in corrosion resistance. Thus, when an optical recording medium is exposed to the atmosphere or moisture, it gradually has a lower recording performance, until it is completely oxidized to lose its characteristics as a recording medium. Especially, the amorphous magnetic material such as GdTbFe has a poor corrosion resistance.

In order to obviate such a drawback, there have been proposed provision of a protecting cover such as a protecting layer of, for example, $SiO_2$ or $SiO$, and a disk-form recording medium sealed in an inert gas.

However, we have found that the protective effect of an oxide film such as $SiO$, $SiO_2$ or $Al_2O_3$ film is not sufficient when the optical recording medium is as thin as several hundred angstromes or below. This is considered because, when an oxide film is used, oxygen in the oxide per se is combined with the optical recording medium, and moreover the film of an oxide is porous and is easily penetrable by molecules of, e.g., water vapor.

On the other hand, a film of a nitride such as AlN or $Si_3N_4$ has been used as a protecting layer. Such a nitride film, however, is inferior to an oxide film in adhesiveness to a plastic substrate and has a drawback that it has too high a refractive index.

SUMMARY OF THE INVENTION

An object of the present invention is to provide an optical recording medium which has been improved in corrosion resistance and durability as well as in writing and reading efficiencies.

The present invention provides an optical recording medium wherein a film of a mixture of an oxide and a nitride in order to accomplish the above object.

Thus, a film of a nitride-oxide mixture adopted in the present invention is superior to a film of an oxide alone in corrosion resistance and durability, and is excellent in adhesion to a plastic substrate. Moreover, the refractive index of the nitride-oxide mixture film can be easily changed and adjusted by changing the mixing ratio between the nitride and the oxide, whereby the writing and reading efficiencies can be improved.

These and other objects, features and advantages of the present invention will become more apparent upon a consideration of the following description of the preferred embodiments of the present invention taken in conjunction with the accompanying drawing. In the following description, "parts" and "%" referring to compositions are by weight unless otherwise noted specifically.

BRIEF DESCRIPTION OF THE DRAWING

The sole FIGURE in the drawing is a sectional view of an embodiment of the optical recording medium according to the present invention.

DESCRIPTION OF THE PREFERRED EMBODIMENT

As a preferred embodiment of the optical recording medium according to the present invention, a laminated structure of a magnetic recording medium for optical recording and reproduction is shown in the drawing. Referring to the drawing, on a plastic substrate or base plate 1 of the writing side are successively formed a mixture film 2, a recording magnetic layer 3, a spacer layer 4, a reflection layer 5, and an adhesive layer 6. The resultant laminate is further applied to an outer plastic substrate or base plate 1b through the adhesive layer 6, whereby a magnetic recording medium is obtained.

The plastic substrate 1 may preferably be a transparent plastic disk substrate with a thickness of the order of 1 mm comprising, for example, an acrylic resin.

Preferred examples of the nitride-oxide mixture for giving the mixture film or layer 2 include a mixture of AlN and $Al_2O_3$, one of $Si_3N_4$ and $SiO$, and one of $Si_3N_4$ and $SiO_2$.

The production of these mixture films can basically be carried out in an arbitrary process but is preferably be carried by the reactive vapor deposition process or the reactive sputtering process using Al, Si, AlN, $Si_3N_4$, etc. as the vaporization source. When these processes are used for forming the mixture film, the mixing ratio between the oxide and nitride can be easily varied depending on the ratio of the flow rates of $O_2$ and $N_2$ forming the process atmosphere, whereby an appropriate composition of the mixture film can be formed. Accordingly, for the $Si_3N_4$-$SiO_2$ mixture system, a desired refractive index of the mixture film can be obtained ranging from 1.45 which is the refractive index of $SiO_2$ film to 2.0, that of $Si_3N_4$ film. For the AlN-$Al_2O_3$ mixture film, a desired refractive index of the mixture film can be obtained ranging from 1.6, the refractive index of $Al_2O_3$ film, to 2.3, that of AlN.

The thickness of the mixture film 2 is suitably of the order of 500 to 3000 Å. The ratio of the nitride and the oxide in the mixture film may be a desired value within the range of from 9:1 to 1:9, preferably from 7:3 to 3:7. Further, it is possible to vary the composition, thus the refractive index, in the direction of the thickness. These preferable ranges for the thickness and compositional ratios hold true with the optical recording medium according to the present invention, in general.

As the recording magnetic layer 3 is preferably used a ternary amorphous film of GdTbFe or a quaternary amorphous film of GdTbFeCo in a thickness of around 200 Å.

Further, as the spacer layer 4, an $SiO_2$ or SiO film or a mixture film as used for the layer 2 is preferably used in a thickness of the order of 500 to 3000 Å.

The adhesive layer 5 may, for example, be formed by a silicone adhesive such as SE1700 produced by Toray Silicone K.K. in a thickness of the order of 10 microns.

The outer plastic substrate 1b may preferably be an acrylic resin plate as the plastic substrate 1.

As described hereinabove, the present invention provides an optical recording medium which comprises a nitride-oxide mixture layer on either one or both sides of an optical recording layer. Because of the provision of the mixture layer, the durability of the recording layer can be improved especially when the substrate is a plastic plate such as that of an acrylic resin. Furthermore, the optical recording medium can have improved writing and readout efficiencies by adjusting the mixing ratio of the nitride and the oxide and thus the refractive index of the mixture layer.

The present invention will be further described with reference to specific examples of practice as follows.

EXAMPLE 1

An optical magnetic recording medium having a laminar structure substantially as shown in the drawing was produced.

Thus, on a 1 mm-thick plastic substrate of the writing side was formed a mixture layer 2 as a primer layer comprising $Si_3N_4$ and $SiO_2$ in weight proportions of 6:4 and having a refractive index of about 1.7 and a thickness of 1000 Å by the reactive vapor deposition process using an Si target in a reduced pressure of a mixture gas comprising $N_2$, $O_2$ and Ar in volume proportions of 2:1:7. On the mixture layer 2 was formed a recording magnetic layer 3 comprising a 200 Å-thick GdTbFeCo quaternary amorphous film containing Gd, Tb, Fe and Co in atomic ratios of 1:1:6:2 by the sputtering process and further a reflection layer 5 comprising 1000 Å-thick Al film to which a 1 mm-thick outer plate 1b of an acrylic resin was applied through a 10 microns-thick layer of a silicone adhesive (SE1700 mfd. by Toray Silicone K.K.).

In the thus obtained recording medium, the adhesion between the substrate and the mixture film was sound and, after 200 hours of a moisture resistance test under the conditions of 45° C. and 90%RH, no corrosion, cracking nor change in appearance was found in the magnetic layer or the mixture layer. Moreover, deterioration of magnetic property of the magnetic layer was little as evidenced by a value of 0.9 in terms of the ratio between the coersive forces before and after the above moisture resistance test. Thus an improved durability was attained. Further, compared with a control recording medium wherein an $SiO_2$ film having a refractive index of 1.45 was formed instead of the mixture film, the above obtained recording medium was found to have an improved writing efficiency due to decrease in reflectivity of from 35 to 25% as measured by a spectral reflectance tester and an improved readout efficiency due to increase in Kerr rotation angle.

EXAMPLE 2

An optical recording medium was obtained substantially in the same manner as in Example 1 except that a 1000 Å-thick mixture film comprising AlN and $Al_2O_3$ in weight portions of 6:4 and having a refractive index of about 1.8 was formed instead of the $Si_3N_4$-$SiO_2$ mixture film by the reactive sputtering process in a reduced pressure of a mixture gas comprising $N_2$, $O_2$ and Ar in volume proportions of 2.5:0.5:7.0. The thus obtained optical magnetic recording medium was found to have improved durability and writing and readout efficiencies as that of Example 1.

What is claimed is:

1. A magneto-optical recording medium, comprising:
   a magneto-optical recording layer; and
   a mixture film formed on at least one side of said magneto-optical recording layer, said mixture film comprising a mixture layer of aluminum oxide or silicon oxide and aluminum nitride or silicon nitride wherein the weight ratio of the nitride to the oxide in the mixture film is between about 1:9 to 9:1.

2. The magneto-optical recording medium according to claim 1, wherein said mixture film comprises a silicon oxide and a silicon nitride or an oxide and nitride of the same metal species.

3. The magneto-optical recording medium according to claim 2, wherein said mixture film comprises a mixture of $Si_3N_4$ and $SiO_2$.

4. The magneto-optical recording medium according to claim 2, wherein said mixture film comprises a mixture of $Si_3N_4$ and SiO.

5. The magneto-optical recording medium according to claim 2, wherein said mixture film comprises a mixture of AlN and $Al_2O_3$.

6. The magneto-optical recording medium according to claim 1, wherein said mixture film has a thickness of from 500 to 3000 Å.

7. A magneto-optical recording medium, comprising:
   a plastic substrate;
   a protective layer;
   a magneto-optical recording layer capable of magneto-optical recording formed on said protective layer;
   a light-transmissive spacer layer formed on said magneto-optical recording layer; and
   a reflection layer formed on said spacer layer, wherein said protective layer comprises a mixture layer of aluminum oxide or silicon oxide and aluminum nitride or silicon nitride wherein the weight ratio of the nitride to the oxide in the mixture is between about 1:9 and 9:1.

8. The magneto-optical recording medium according to claim 7, wherein said spacer layer comprises a mixture of either a silicon or metal oxide and a silicon or metal nitride.

9. The magneto-optical recording medium according to claim 7, wherein said magneto-optical recording layer comprises an amorphous rare earth-transition metal alloy.

* * * * *

UNITED STATES PATENT AND TRADEMARK OFFICE
CERTIFICATE OF CORRECTION

PATENT NO.   : 4,920,007
DATED        : April 24, 1990
INVENTOR(S)  : MITSUHARU SAWAMURA ET AL.

It is certified that error appears in the above-identified patent and that said Letters Patent is hereby corrected as shown below:

COLUMN 1

Line 57, "angstromes" should read --angstoms--.

COLUMN 2

Line 39, "plate 1" should read plate 1a--.
    Line 45, "plastic substrate 1" should read --plastic substrate 1a--.
    Line 54, "be carried" should read --carried out--.

COLUMN 3

Line 21, "plastic substrate 1." should read --plastic substrate 1a.--.
    Line 64, "coersive" should read --coercive--.

COLUMN 4

Line 57, "mixture" should read --mixture layer--.

Signed and Sealed this

Fifth Day of May, 1992

Attest:

DOUGLAS B. COMER

Attesting Officer     Acting Commissioner of Patents and Trademarks